(12) United States Patent
Konfrst

(10) Patent No.: US 10,516,306 B2
(45) Date of Patent: Dec. 24, 2019

(54) DIRECT-CURRENT ELECTRIC MOTOR

(75) Inventor: Vaclav Konfrst, Kladno (CZ)

(73) Assignee: COMINFO, A.S., Zlín, Prstne (CZ)

(*) Notice: Subject to any disclaimer, the term of this patent is extended or adjusted under 35 U.S.C. 154(b) by 0 days.

(21) Appl. No.: 14/126,589

(22) PCT Filed: May 11, 2012

(86) PCT No.: PCT/CZ2012/000039
§ 371 (c)(1),
(2), (4) Date: May 28, 2014

(87) PCT Pub. No.: WO2012/155868
PCT Pub. Date: Nov. 22, 2012

(65) Prior Publication Data
US 2014/0265697 A1 Sep. 18, 2014

(30) Foreign Application Priority Data
May 17, 2011 (CZ) .................................... 2011-293

(51) Int. Cl.
*H02K 1/27* (2006.01)
*H02K 31/00* (2006.01)

(52) U.S. Cl.
CPC .............. *H02K 1/27* (2013.01); *H02K 31/00* (2013.01)

(58) Field of Classification Search
CPC .......... H02K 1/278; H02K 21/16; H02K 1/02; H02K 23/04; H02K 1/17; H02K 1/27; H02K 31/00; H02K 16/005; H02K 23/16; C23F 11/00

USPC ........ 310/49.28, 154.01, 156.01, 12.08, 268, 310/425, 30, 12.14, 177, 178
See application file for complete search history.

(56) References Cited

U.S. PATENT DOCUMENTS

| | | | | |
|---|---|---|---|---|
| 3,418,505 A | * | 12/1968 | Mihalko | H02K 3/00 310/154.07 |
| 3,602,745 A | * | 8/1971 | Davis | H02K 41/025 310/13 |
| 3,641,376 A | * | 2/1972 | Livingston | G01P 3/49 310/113 |
| 4,082,970 A | * | 4/1978 | Girardin | H02K 47/14 310/113 |

(Continued)

OTHER PUBLICATIONS

Continuous Pole DC Motor, an IP.com prior art database technical disclosure.*

(Continued)

*Primary Examiner* — Mang Tin Bik Lian
*Assistant Examiner* — Ahmed Elnakib
(74) *Attorney, Agent, or Firm* — Hauptman Ham, LLP

(57) ABSTRACT

For applications standard d-c machines require gear-boxes, there is designed a d-c motor provided with a first basic element (1) made of magnetic conductive material and carrying a system of unipolar oriented magnets (3) and further provided with a second basic element (2) made of magnetic non-conductive material and carrying at least one coil (4) with leads for connection to a source of d-c current. The coil (4) is located on a core (5) made of a magnetic conductive material and arranged mutually spaced apart along the system of the magnets. The first and the second parts are mutually relatively movable. In a preferred application the magnets are made of permanent magnets (3).

9 Claims, 2 Drawing Sheets

(56) References Cited

U.S. PATENT DOCUMENTS

| | | | | |
|---|---|---|---|---|
| 4,307,309 A * | 12/1981 | Barrett | | H02K 19/24 310/166 |
| 4,459,501 A * | 7/1984 | Fawzy | | H02K 21/125 310/156.69 |
| 4,514,653 A * | 4/1985 | Batni | | 310/178 |
| 4,992,689 A * | 2/1991 | Bookout | | F04D 13/10 310/87 |
| 5,698,911 A * | 12/1997 | Dunfield | | G11B 5/5521 310/12.01 |
| 5,844,345 A * | 12/1998 | Hsu | | H02K 31/02 310/115 |
| 5,859,486 A * | 1/1999 | Nakahara | | H02K 1/14 310/216.004 |
| 5,942,829 A * | 8/1999 | Huynh | | H02K 21/046 310/156.28 |
| 5,977,684 A * | 11/1999 | Lin | | H02K 21/12 310/178 |
| 6,465,919 B1 * | 10/2002 | Yoshida | | H02K 5/00 310/67 R |
| 6,803,691 B2 * | 10/2004 | Rose | | H02K 21/12 310/156.32 |
| 6,891,296 B1 * | 5/2005 | Huang | | H02K 1/2733 310/154.01 |
| 7,348,703 B2 * | 3/2008 | Bojiuc | | H02K 3/28 310/154.02 |
| 7,498,706 B2 * | 3/2009 | Kuroda | | H02K 23/04 310/154.01 |
| 2001/0004171 A1 * | 6/2001 | Griswold | | H02K 41/0356 310/30 |
| 2010/0289385 A1 * | 11/2010 | Smirnov et al. | | 310/425 |

OTHER PUBLICATIONS

English machine translation of JP 61-173658; Miyanoo et al. Aug. 1986; Japan.*

English machine translation of JP 04-67744; Imai et al. Mar. 1992; Japan.*

English translation for JPH 0467744; Imai Yasuaki; Mar. 1992; Japan.*

English translation of CN 2452204; Guo et al.; Oct. 2001.*

English translation of CN 2226352; Guo et al.; May 1996.*

English translation of JPH 0833298; Tadao et al.; Feb. 1996.*

\* cited by examiner

DIRECT-CURRENT ELECTRIC MOTOR

TECHNICAL FIELD

The invention relates to a direct-current electric motor.

BACKGROUND OF THE INVENTION

Existing d-c motors, i.e. electric motors supplied by a d-c current, operate on the basis of commutation of current in conductors positioned within a magnetic field induced by alternatively oriented poles: The commutation of the current depending upon polarity of magnetic flux and direction of conductor movement is performed by means of a commutator, a mechanical device providing for switching between coils. Electric current is supplied to the commutator by means of carbon brushes. The d-c motor speed generally depends upon voltage and current running through the motor windings and is influenced by the load, i.e. by braking torque. The d-c motor speed can be easily controlled by changing the supply voltage and/or by excitation when the magnets are provided for by windings on salient poles. Necessary application of a commutator is a great disadvantage of known d-c machine constructions. Due to its construction and heavy mechanical stress, it needs regular maintenance and rather often exchange of the brushes. Sparking between the brushes and the commutator surface causes energy loss and electromagnetic interference. Development and progress in power electronics has resulted in gradual substitution of classic d-c machines by machines with electronic excitation of a rotating magnetic field. Current commutation either by a mechanical commutator or by electronic means represents also high men power and respective high material and labour costs. Magnetic poles made of permanent magnets simplify manufacturing process but are not suitable for all the applications and very often need gear-boxes.

It is an object of the invention to create a simple machine featuring simple regulation of direction and speed of rotation, low moment of inertia and simultaneously offering capability of installation within a relatively small area.

It is still a further object of the invention to create a machine featuring high long-term operational reliability without demands on maintenance during service.

Disclosure and Object of the Invention

The foregoing problems are solved by a direct-current electric motor designed in accordance with the present invention, the motor being provided with a first basic element made of magnetically conductive material and carrying a system of unipolar oriented magnets and further provided with a second basic element made of magnetically non-conductive material and carrying at least one coil with leads for connection to a source of d-c current. The coil is located on a core made of a magnetically conductive material and arranged mutually spaced apart along the system of the magnets. The first and the second parts are mutually movable, what means that the either the first basic element moves with respect to the second basic element or vice versa or each of basic elements may move with respect to the other element. In a preferred application the magnets are made of permanent magnets. In the first preferred embodiment of the motor the first basic element serves as stator and the second part, which is located in a swivelling seat, carries a core supporting at least one coil. In the second preferred embodiment of the motor a stator comprise the first basic element and the core, while the rotor comprise the second basic element being positioned in a swivelling seat and carrying at least one coil, the coil being arranged spaced apart around the core.

The d-c electric motor in accordance with the invention features a simple construction eliminating any kind of current commutation and therefore the mutual position of a rotor and a stator along the whole effective work path needs no sensor identification to satisfy physical condition for motor operation. As the magnetic circuit is made of solid material it is not necessary to use laminated construction as it is by the standard d-c machines.

The design of the motor offers a very economically advantageous embodiment not only with respect to production costs but also minimized operation costs as maintenance during operation is eliminated and the motor service life is very long due to elimination of fast wearing parts. The motor according the invention represents a very robust equipment resistant against surroundings, especially dust and moisture. According to another particular feature of the invention the motor speed and moment can be adapted to a driven equipment without otherwise necessary gear-box.

BRIEF DESCRIPTION OF THE DRAWINGS

The invention is further illustrated by way of examples presented in the accompanying drawings, where FIG. 1 schematically illustrates arrangement of the motor parts and their functions.

DESCRIPTION OF PREFERRED EMBODIMENTS

Figure 3:
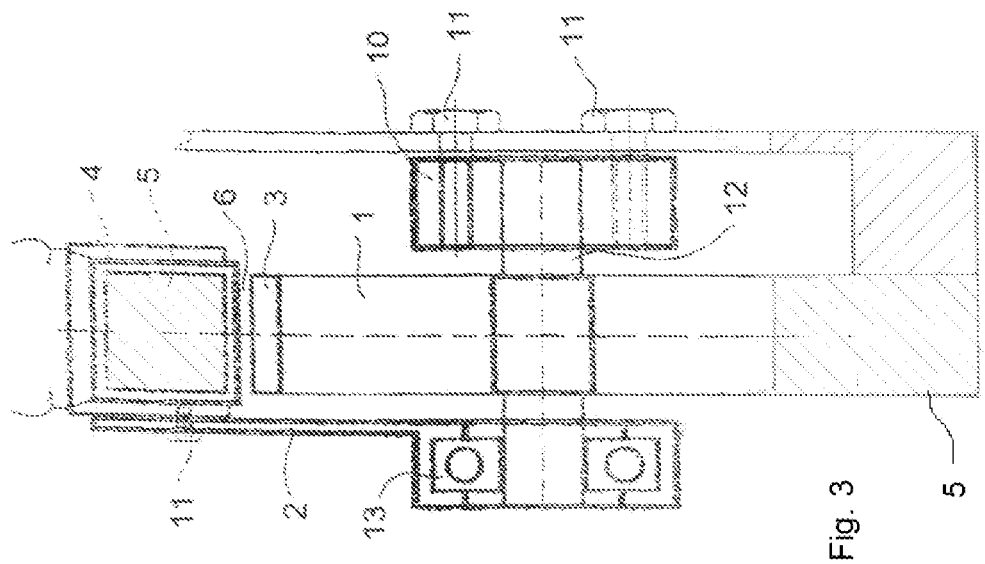
FIG. 2 shows in an axial cross-sectional view an embodiment with the first basic element as a stator and second basic element in a function of a rotor and FIG. 3 depicts a variation to the embodiment according to FIG. 2 where the second basic element is arranged for a reverse movement along a circular-type path.
Figure 2:
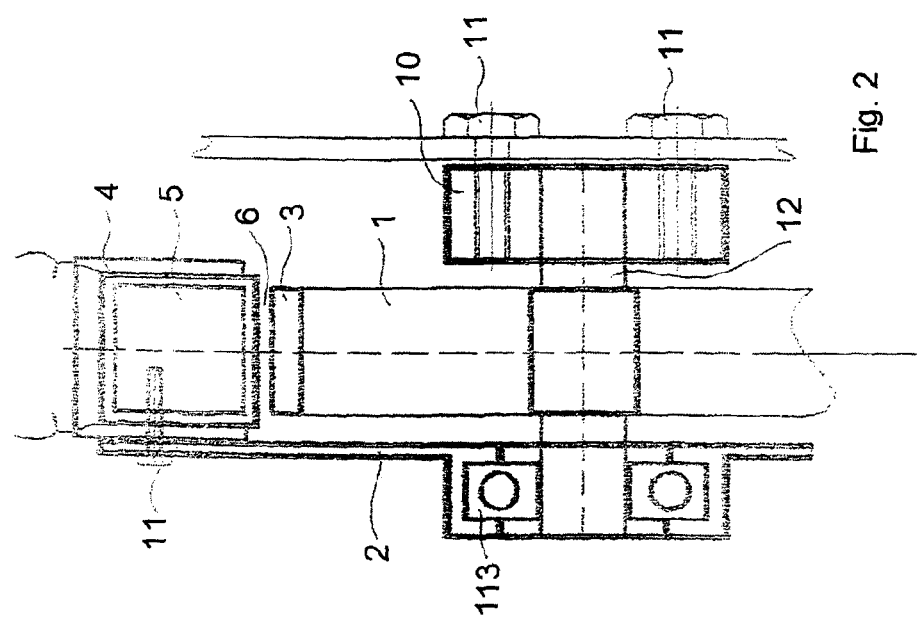

Referring to FIGS. 2 and 3, the electric motor in principle consists of two parts. The first basic element 1, made of magnetically conductive material, carries a system of unipolary oriented permanent magnets 3 which are radially oriented with respect to a rotation axis of the motor. The second basic element 2, which is made of magnetically non-conductive material, carries at least one coil 4 with leads for connection to a d-c current source. The coil 4 is positioned on a core 5 made of magnetically conductive material. The core is radially spaced apart from the permanent magnets 3. The space between the core 5 and the permanent magnets 3 provides for air-gap 6 of the motor magnetic field.

Figure 1:
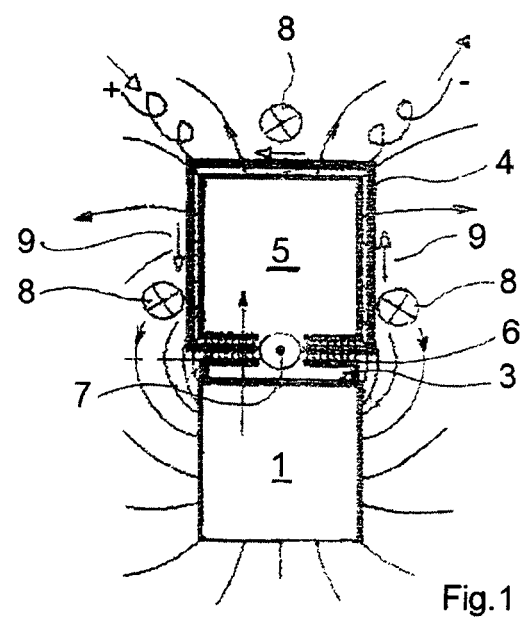

Theoretically the second basic element 2 serving as rotor may move with respect to the first basic element 1 representing a stator, or both parts 1, 2 may have the opposite functions, i.e. the first basic element 1 operating as a rotor and the second basic element 2 being a stator. It is also possible that both basic elements 1, 2 may move with respect to the other one. FIG. 1 for simplification shows only the first basic element 1.

In the following explanation of a function of the motor it is supposed that the first basic element is stationary and serves as a stator, and the second basic element works as a rotor.

The motor in arrangement according to FIG. 1 operates in such a way, that a forward force 7 resulting from a vector product of a vector of a density of magnetic flux inside an air-gap and a vector of current in the coil 4 conductors is significantly greater than a backward force 8 resulting from a vector product of vectors of density of magnetic flux along a core 5 circumference and a vector of current in the coil 4 conductors, the backward force 8 acting in an opposite direction to the forward force 7 action. The difference between the forward force 7 and the backward force 8 is due to a non-linear space distribution of a reluctance of the permanent magnet 3 closed magnetic circuit and therefore the density of magnetic flux leaving magnetic conductive core 5 material within an area of coil 4 current vector 9 action is significantly smaller than the magnetic flux density within the air-gap 6. The difference between the two forces 7,8 provides for the motor traction force. Along the whole length of its working path the discussed motor utilise an unipolar magnetic field.

The first practical example of the above discussed arrangement is the embodiment which in a simplified form is presented in FIG. 2. By this embodiment the machine rotor revolves along a circular path.

As shown in FIG. 2 the motor is provided with a flange 10 for attachment to construction of an equipment where the motor is built in, e.g. by means of bolts 11. A shaft 12 is by its one end attached in the flange 10, the shaft 12 carrying the first basic element 1. As said above, the first basic element 1 is made of a solid magnetically conductive material. The first basic element 1 of a disc-type shape is on its circumferential side provided with a system of unipolar oriented permanent magnets 3 which are radially oriented with respect to a rotation axis of the motor. On the side opposite to the flange 10 position, in a bearing 13 on a shaft 12 shoulder there is located the second basic element 2 made of magnetically non-conductive material. The second basic element 2 having a shape of a flat disc carries in overhung attached core 5. The core 5 made of magnetically conductive material and having a shape of a ring of a quadrangle cross-section is arranged spaced apart from the permanent magnets 3. On the core 5 there are located wound coils 4 connected to slip-rings providing for a d-c current input. To simplify the drawings the slip-rings known as such are not shown. The coils 4, usually three or four of them are regularly disposed along the ring-shaped core 5 circumference and with respect to the permanent magnets the coils 4 are arranged radially. According to a supply voltage and required current the coils 4 may be connected in series or in parallel. It is important to maintain the same direction of current vectors 9 in all the coils 4.

As an alternative embodiment to the above described construction the core 5 may be carried by a pair of second basic elements 2 arranged at the shaft 12 with the first basic element 1 located in the middle. This design offers a mechanically better arrangement then the overhung seat of the core 5, but requires more space within the equipment in which the motor is to be built-in. Similarly it applies for the shaft 12 seat. The shaft 12 can also be supported on both sides.

The permanent magnets 3 and the coils 4 may be arranged spaced apart also in an axial direction.

The second practical example of the basic arrangement is the embodiment which in a simplified form is presented in FIG. 3. By this embodiment the machine rotor performs a reverse movement, i.e. the movement along limited path, in particular a forward movement to a set position and a reverse movement back to the original position. Principle arrangement of this invention embodiment is the same as in FIG. 2. The motor is provided with a flange 10 for attachment to an equipment of application. The flange 10 supports one end of the shaft 12, on which there is fixed the first basic element 1. The first basic element 1, made of solid material and having a shape of a flat disc sector, caries on its front side a system of unipolar oriented permanent magnets 3 which are radially oriented with respect to a rotation axis of the motor. The sector central angle depends on a required rotor movement range. Also by this invention embodiment the first basic element 1 operates as a stator. On the side opposite to flange 10 position, in a bearing 13 on a shaft 12 shoulder there is located the second basic element 2 made of magnetically non-conductive material. The second basic element 2 having a shape of a flat disc sector, caries in overhung attached coil 4 or as the case may be more than one coil 4. The sector central angle corresponds to dimensions of the coil 4 or the set of coils 4, respectively. The coil 4, or coils 4, loosely surrounds the core 5 in such a way that it may freely move along the core 5. The core 5 has a shape of a ring which runs constantly spaced apart along the permanent magnet 3 surfaces, thus allowing for a movement of the coil 4 along the permanent magnet 3 outside surface. At its both utmost sides the core 5 is mechanically connected with the first basic element 1 and therefore, quite to the opposite to the first embodiment according to FIG. 1, the core 5 is a part of the stator. The second basic element 2 functioning as a rotor transfers the motor power upon a driven equipment.

Alternatively the embodiment according to FIG. 3 can be designed as a linear motor. The first basic element 1 and the core shall operate as a stator and the second basic element 2 with a coil 4 shall have the function of a rotor. The linear motor in accordance with the invention can be also designed with a rotor to move along a path having a shape of a pre-selected curve, i.e. along path being not just straight.

For an expert in the field it is obvious that in all the discussed embodiments the functions of both basic elements 1,2 could be mutually interchanged.

Though only permanent magnets have been discussed in all the above presented embodiments it is also obvious that instead of the permanent magnets 3 the same result can be achieved when wound magnets supplied with a d-c current are used. Nevertheless an application of the permanent magnets 3 is advantageous as they require significantly less space. The application of one of the two types of magnets depends upon the given operational parameters with respect to the required output and space available for the motor to be built-in.

Offering the same conditions for speed control as by standard direct-current motors the motor according to the invention features very simple construction with no need for maintenance during operation.

The invention claimed is:
1. A direct-current electric motor, comprising:
a first basic element having a shape of a disc or a disc sector made of magnetically conductive material and carrying a single system of unipolar oriented magnets on an outside curved circumference of the first basic element; and
a second basic element having a shape of a disc or a disc sector made of magnetically non-conductive material, the second basic element being located axially spaced apart from the first basic element and carrying at least one coil with leads for connection to a source of d-c current,
wherein
the first and second basic elements are mutually movable, the at least one coil is located on a core made of a magnetically conductive material and arranged radially spaced apart along the single system of unipolar oriented magnets, a magnetic flux in an air-gap is oriented radially with respect to a motor axis of rotation, and the motor axis of rotation is perpendicular to both the first and second basic elements and passes through a center of a curvature of the first basic element.

2. The direct-current electric motor according to claim 1, wherein the magnets are permanent magnets.

3. The direct-current electric motor according to claim 1, wherein the first basic element serves as a stator, and the second basic element is mounted pivotably and carries the core supporting the at least one coil.

4. The direct-current electric motor according to claim 1, wherein a motor stator comprises the first basic element and the core, and a motor rotor comprises the second basic element.

5. The direct-current electric motor according to claim 1, wherein a motor stator comprises the second basic element, the core, and the coil arranged around the core, and a motor rotor comprises the first basic element and the magnets.

6. The direct-current electric motor according to claim 1, wherein a thickness of the first basic element from a periphery of the first basic element toward the motor axis of rotation is substantially uniform.

7. The direct-current electric motor according to claim 1, wherein a thickness of an entirety of the first basic element is substantially uniform.

8. The direct-current electric motor according to claim 1, wherein the first basic element serves as a stator, and the second basic element, the core, and the coil or coils serve as a rotor, the coils being connected to the source of the d-c current by means of brushes and slip rings.

9. The direct-current electric motor according to claim 1, wherein the first basic element and the magnets serve as a rotor, and the second basic element, the core, and the coil or coils serve as a stator.

* * * * *